Patented May 31, 1927.

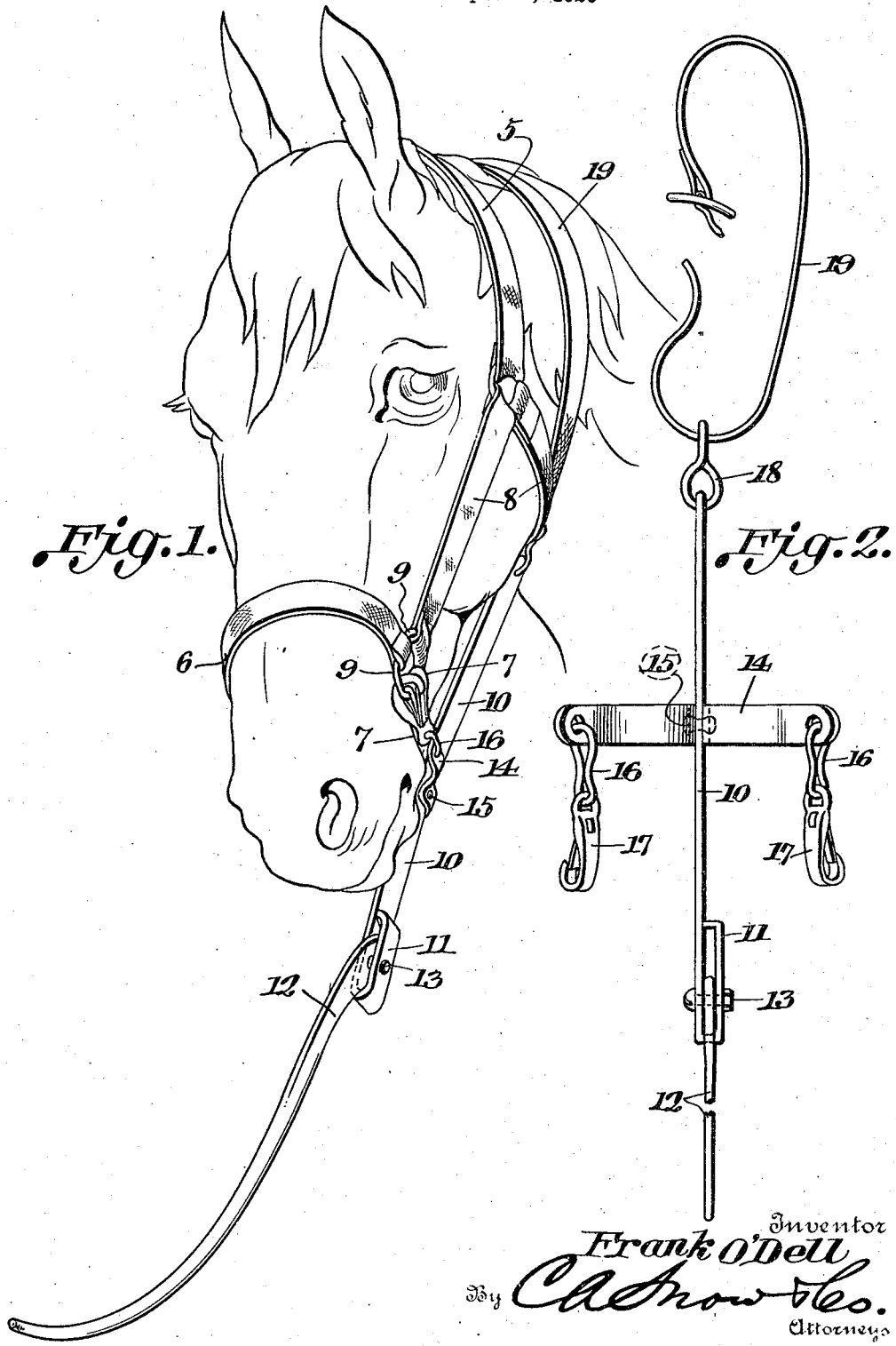

1,630,447

UNITED STATES PATENT OFFICE.

FRANK O'DELL, OF UNION CITY, INDIANA.

STEEL YOKE.

Application filed September 14, 1926. Serial No. 135,396.

This invention relates to restraining devices and aims to provide a device which may be readily and easily positioned on an animal's head and partially supported by the halter.

Another object of the invention is to provide a device of this character which will extend beyond the head of the animal so that it will catch in a fence or other obstruction, should the animal endeavor to jump over a fence.

A still further object of the invention is to provide means for setting up a binding action between the strap of the device and animal's head on which it is positioned.

With the foregoing and other objects in view which will appear as the description proceeds, the invention resides In the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a view illustrating the manner of positioning a restraining device constructed in accordance with the invention.

Figure 2 is a front elevational view.

Referring to the drawing in detail, the reference character 5 indicates a halter which embodies nose strap 6, chin strap 7 and jaw straps 8, the nose strap and chin strap having connection with the rings 9.

The restraining device forming the essence of this invention and which is adapted to be partially supported by the halter includes a main bar 10 which has one of its ends bent rearwardly as at 11 where it is arranged in spaced relation with the main portion 10 providing a clearance for one end of the rod 12 which is pivotally connected with the bar 10 at 13.

This rod 12 is shown as curved upwardly so that it will engage the transverse bars or wires of a fence and prevent an animal on which the restraining device is positioned, from jumping the fence.

The reference character 14 indicates a jaw bar which is curved to conform to the underside of the jaw of the animal on which the device is positioned, the bar 14 having an offset portion to receive the bar 10 which is secured to the bar 14 by means of rivet 15.

At the ends of this bar 14 are openings in which the links 16 are positioned, the links 16 having connection with the snap hooks 17 that pass into the rings 9 of the halter to hold that portion of the restraining device in position.

An opening is formed at one end of the bar 10 and receives the link 18 through which the strap 19 passes, the strap 19 being designed to pass over the animal's neck adjacent to the head strap of the halter, as clearly shown by Figure 1.

Thus it will be seen that when downward pressure is brought to bear on the rod 12, the forward end of the bar 10 will be forced downwardly pushing the inner end of the bar 10 against the jaw of the animal and at the same time creating a binding action on the neck of the animal.

I claim:

In a device of the character described, a main bar, a strap secured at one end of the main bar and adapted to be positioned around the neck of an animal, a transverse supporting bar secured to the main bar and curved to conform to the shape of the animal's jaw, snap hooks secured to the bar and adapted to be connected to the halter on the animal to which the device is secured to support the forward end of the device, and a pivoted rod carried at the forward end of the bar and extending outwardly therefrom.

In testimony that I claim the foregoing as my own, I have hereto affixed my signature.

FRANK O'DELL.